(12) United States Patent
Robles et al.

(10) Patent No.: US 8,056,022 B2
(45) Date of Patent: Nov. 8, 2011

(54) ANALYSIS OPTIMIZER

(75) Inventors: Juan Andres Torres Robles, Wilsonville, OR (US); William S. Graupp, Aurora, OR (US); Mark C. Simmons, Wilsonville, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 444 days.

(21) Appl. No.: 11/937,423

(22) Filed: Nov. 8, 2007

(65) Prior Publication Data
US 2008/0141195 A1 Jun. 12, 2008

Related U.S. Application Data

(60) Provisional application No. 60/857,958, filed on Nov. 9, 2006.

(51) Int. Cl.
*G06F 17/50* (2006.01)
*G06F 19/00* (2011.01)
*G03F 1/00* (2006.01)
*G21K 5/00* (2006.01)
*G06K 9/46* (2006.01)

(52) U.S. Cl. ............... 716/52; 716/53; 716/54; 716/55; 716/111; 430/5; 700/98; 700/108; 700/121; 378/35; 382/145; 382/154

(58) Field of Classification Search .............. 716/21, 716/52, 53, 54, 55, 111; 700/98, 108, 121; 430/5; 378/35; 382/145, 154
See application file for complete search history.

(56) References Cited

U.S. PATENT DOCUMENTS

| | | | |
|---|---|---|---|
| 4,532,650 | A | 7/1985 | Wihl et al. |
| 4,762,396 | A | 8/1988 | Dumant et al. |
| 5,396,584 | A | 3/1995 | Lee et al. |
| 5,502,654 | A | 3/1996 | Sawahata |
| 5,558,963 | A | 9/1996 | Tsudaka et al. |
| 5,655,110 | A | 8/1997 | Krivokapic et al. |
| 5,723,233 | A | 3/1998 | Garza et al. |
| 5,723,235 | A | 3/1998 | Tsudaka et al. |
| 5,815,685 | A | 9/1998 | Kamon |
| 5,825,647 | A | 10/1998 | Tsudaka |
| 5,879,844 | A | 3/1999 | Yamamoto et al. |

(Continued)

FOREIGN PATENT DOCUMENTS
JP 07-175204 7/1995
(Continued)

OTHER PUBLICATIONS

Adam et al., "Improved Modeling Performance with an Adapted Vectorial Formulation of the Hopkins imaging Equation," *Proceedings of SPIE: Optical Microlithography XVI*, vol. 5040, pp. 78-91 (Feb. 25, 2003).

(Continued)

*Primary Examiner* — Phallaka Kik
(74) *Attorney, Agent, or Firm* — Klarquist Sparkman, LLP

(57) ABSTRACT

A method of preparing a set of target layout data for the application of a photolithographic friendly design (LFD) analysis or other photolithographic analysis. The target layout data is revised to remove areas or features prior to performing the LFD analysis. The features removed include features that have been determined to print correctly, duplicate features and features that are not sensitive to variations in process conditions. The revised target layout is analyzed to determine if the features that remain will print correctly on a wafer.

40 Claims, 12 Drawing Sheets

U.S. PATENT DOCUMENTS

| | | | |
|---|---|---|---|
| 5,991,006 A | 11/1999 | Tsudaka | |
| 6,016,357 A | 1/2000 | Neary et al. | |
| 6,033,814 A | 3/2000 | Burdorf et al. | |
| 6,042,257 A | 3/2000 | Tsudaka | |
| 6,049,660 A | 4/2000 | Ahn et al. | |
| 6,077,310 A | 6/2000 | Yamamoto et al. | |
| 6,080,527 A | 6/2000 | Huang et al. | |
| 6,120,952 A | 9/2000 | Pierrat et al. | |
| 6,128,067 A | 10/2000 | Hashimoto | |
| 6,187,483 B1 | 2/2001 | Capodieci et al. | |
| 6,243,855 B1 | 6/2001 | Kobayashi et al. | |
| 6,249,904 B1 | 6/2001 | Cobb | |
| 6,263,299 B1 | 7/2001 | Aleshin et al. | |
| 6,269,472 B1 | 7/2001 | Garza et al. | |
| 6,301,697 B1 | 10/2001 | Cobb | |
| 6,317,859 B1 | 11/2001 | Papadopoulou | |
| 6,415,421 B2 | 7/2002 | Anderson et al. | |
| 6,425,113 B1 | 7/2002 | Anderson et al. | |
| 6,430,737 B1 | 8/2002 | Cobb et al. | |
| 6,453,457 B1 | 9/2002 | Pierrat et al. | |
| 6,467,076 B1 | 10/2002 | Cobb | |
| 6,470,489 B1 | 10/2002 | Chang et al. | |
| 6,487,503 B2 | 11/2002 | Inui | |
| 6,499,003 B2 | 12/2002 | Jones et al. | |
| 6,574,784 B1 | 6/2003 | Lippincott et al. | |
| 6,643,616 B1 | 11/2003 | Granik et al. | |
| 6,649,309 B2 | 11/2003 | Mukherjee | |
| 6,665,856 B1 | 12/2003 | Pierrat et al. | |
| 6,668,367 B2 | 12/2003 | Cobb et al. | |
| 6,718,526 B1 | 4/2004 | Eldredge et al. | |
| 6,748,578 B2 | 6/2004 | Cobb | |
| 6,778,695 B1 | 8/2004 | Schellenberg et al. | |
| 6,792,590 B1 | 9/2004 | Pierrat et al. | |
| 6,815,129 B1 | 11/2004 | Bjorkholm et al. | |
| 6,817,003 B2 | 11/2004 | Lippincott et al. | |
| 6,857,109 B2 | 2/2005 | Lippincott | |
| 6,862,726 B2 | 3/2005 | Futatsuya et al. | |
| 6,887,633 B2 | 5/2005 | Tang | |
| 6,928,634 B2 | 8/2005 | Granik et al. | |
| 6,973,633 B2 | 12/2005 | Lippincott et al. | |
| 6,989,229 B2 | 1/2006 | Lucas et al. | |
| 7,010,776 B2 | 3/2006 | Gallatin et al. | |
| 7,013,439 B2 | 3/2006 | Robles et al. | |
| 7,017,141 B2 | 3/2006 | Anderson et al. | |
| 7,024,655 B2 | 4/2006 | Cobb | |
| 7,028,284 B2 | 4/2006 | Cobb et al. | |
| 7,047,516 B2 | 5/2006 | Futatsuya | |
| 7,073,162 B2 | 7/2006 | Cobb et al. | |
| 7,155,689 B2 | 12/2006 | Pierrat et al. | |
| 7,155,699 B2 | 12/2006 | Cobb | |
| 7,172,838 B2 | 2/2007 | Maurer et al. | |
| 7,181,721 B2 | 2/2007 | Lippincott et al. | |
| 7,194,725 B1 | 3/2007 | Lukanc et al. | |
| 7,237,221 B2 | 6/2007 | Granik et al. | |
| 7,240,305 B2 | 7/2007 | Lippincott | |
| 7,240,321 B2 | 7/2007 | Cobb et al. | |
| 7,281,234 B2 | 10/2007 | Lippincott | |
| 7,293,249 B2 | 11/2007 | Robles et al. | |
| 7,324,930 B2 | 1/2008 | Cobb | |
| 7,367,009 B2 | 4/2008 | Cobb et al. | |
| 7,378,202 B2 | 5/2008 | Granik et al. | |
| 7,392,168 B2 | 6/2008 | Granik et al. | |
| 2001/0018759 A1* | 8/2001 | Andreev et al. | 716/7 |
| 2001/0049811 A1 | 12/2001 | Taoka | |
| 2002/0026626 A1 | 2/2002 | Randal et al. | |
| 2002/0094680 A1 | 7/2002 | Lin | |
| 2003/0037309 A1* | 2/2003 | Utsunomiya | 716/21 |
| 2003/0134205 A1 | 7/2003 | Yu | |
| 2003/0208728 A1 | 11/2003 | Pierrat | |
| 2004/0128118 A1 | 7/2004 | Croffie et al. | |
| 2004/0268282 A1* | 12/2004 | Rittman et al. | 716/10 |
| 2005/0050490 A1 | 3/2005 | Futatsuya et al. | |
| 2005/0149901 A1 | 7/2005 | Tang | |
| 2005/0177810 A1 | 8/2005 | Heng et al. | |
| 2005/0229125 A1 | 10/2005 | Tabery et al. | |
| 2005/0251771 A1 | 11/2005 | Robles | |
| 2005/0278686 A1 | 12/2005 | Word et al. | |
| 2006/0005154 A1* | 1/2006 | Cobb et al. | 716/5 |
| 2006/0074611 A1* | 4/2006 | Wong et al. | 703/2 |
| 2006/0188796 A1 | 8/2006 | Word | |
| 2006/0199084 A1 | 9/2006 | Word | |
| 2006/0200790 A1 | 9/2006 | Shang et al. | |
| 2006/0240342 A1 | 10/2006 | Tang | |
| 2007/0006118 A1 | 1/2007 | Pierrat et al. | |
| 2007/0074143 A1 | 3/2007 | Cobb et al. | |
| 2007/0118826 A1 | 5/2007 | Lippincott | |
| 2007/0124708 A1 | 5/2007 | Robles et al. | |
| 2007/0204242 A1 | 8/2007 | Brunet et al. | |
| 2007/0204256 A1 | 8/2007 | Brunet et al. | |
| 2007/0240086 A1* | 10/2007 | Sinha et al. | 716/4 |
| 2008/0148217 A1 | 6/2008 | Park | |
| 2008/0166639 A1 | 7/2008 | Park et al. | |
| 2008/0195996 A1 | 8/2008 | Robles et al. | |
| 2008/0256500 A1* | 10/2008 | Cobb et al. | 716/5 |
| 2009/0132980 A1* | 5/2009 | Sinha et al. | 716/5 |
| 2009/0178018 A1 | 7/2009 | Torres Robles et al. | |

FOREIGN PATENT DOCUMENTS

| | | |
|---|---|---|
| JP | 09-319067 | 12/1997 |
| JP | 2001-350250 | 12/2001 |
| JP | 2002-131882 | 5/2002 |
| JP | 2004-502961 | 1/2004 |
| WO | WO 99/14637 | 3/1999 |
| WO | WO 99/14638 | 3/1999 |
| WO | WO 01/65315 | 7/2001 |

OTHER PUBLICATIONS

Bailey et al., "Intensive 2D SEM Model Calibration for 45nm and Beyond," *Proceedings of SPIE*, vol. 6154, 10 pp. (Feb. 21, 2006).

Brist et al., "Illumination Optimization Effects on OPC and MDP," *Proceedings of SPIE*, vol. 5754, pp. 1179-1189 (Mar. 1, 2005).

Brist et al., "Source Polarization and OPC Effects on Illumination Optimization," *Proceedings of SPIE, 25th Annual BACUS Symposium on Photomask Technology*, vol. 5992, pp. 599232-1/9 (Oct. 3, 2005).

Cao et al., "Standard Cell Characterization Considering Lithography Induced Variations," *Design Automation Conference, 43rd ACM/IEEE*, pp. 801-804 (Jul. 24-28, 2006).

Chen et al., "An Automated and Fast OPC Algorithm for OPC-Aware Layout Design," *Int'l Symp. on Quality Electronic Design*, pp. 782-787 (Mar. 26-28, 2007).

Cobb, "Flexible Sparse and Dense OPC Algorithms," *Proceedings of SPIE, Photomask and Next-Generation Lithography Mask Technology XII*, vol. 5853, pp. 693-702 (Apr. 13, 2005).

Cobb et al., "Model-Based OPC Using the MEEF Matrix," *Proceedings of SPIE, 22nd Annual BACUS Symposium on Photomask Technology*, vol. 4889, 10 pp. (Sep. 30-Oct. 4, 2002).

Cobb et al., "Large Area Phase-Shift Mask Design," *Proceedings of SPIE, Symposium on Optical/Laser Microlithography VII*, vol. 2197, pp. 348-360 (Mar. 2-4, 1994).

Cobb et al., "Using OPC to Optimize for Image Slope and Improve Process Window," *Proceeding of SPIE, Photomask Japan*, vol. 5130, pp. 838-846 (Apr. 16-18, 2003).

Cobb et al., "OPC Methods to Improve Image Slope and Process Window," *Proceedings of SPIE: Design and Process Integration for Microelectronic Manufacturing*, vol. 5042, pp. 116-125 (Feb. 27, 2003).

Cobb et al., "Experimental Results on Optical Proximity Correction With Variable Threshold Resist Model," *Proceedings of SPIE: Symposium on Optical Microlithography X*, vol. 3051, pp. 458-468 (Mar. 10-14, 1997).

Cobb et al., "Fast Sparse Aerial Image Calculation for OPC," *Proceedings of SPIE: 15th Annual BACUS Symposium on Photomask Technology and Management*, vol. 2621, pp. 534-545 (Sep. 20-22, 1995).

Cobb et al., "Fast, Low-Complexity Mask Design," *Proceedings of SPIE: Symposium on Optical/Laser Microlithography VIII*, vol. 2440, pp. 313-327 (Feb. 22-24, 1995).

Cobb et al., "Mathematical and CAD Framework for Proximity Correction," *Proceedings of SPIE: Symposium on Optical Microlithography IX*, vol. 2726, pp. 208-222 (Mar. 13-15, 1996).

Cobb et al., "New Concepts in OPC," *Proceedings of SPIE: Optical Microlithography XVII*, vol. 5377, pp. 680-690 (Feb. 24, 2004).

Dammel, "Photoresist for microlithography, or the Red Queen's race," *J. Microlithogr. Microfabrication Microsyst.*, vol. 1, pp. 270-275 (Oct. 2002).

Drapeau et al., "Double patterning design split implementation and validation for the 32nm node," *Proc. SPIE*, vol. 6521, pp. 652109-1 through 652109-15 (2007).

Granik, "Generalized MEEF Theory," *Interface 2001*, 13 pp. (Nov. 2001).

Granik, "New Process Models for OPC at sub-90nm Nodes," *Proceedings of SPIE: Optical Microlithography XVI*, vol. 5040, pp. 1166-1175 (Feb. 25, 2003).

Granik, "Solving Inverse Problems of Optical Microlithography," *Proceedings of SPIE: Optical Microlithography XVIII*, vol. 5754, pp. 506-526 (Mar. 1, 2005).

Granik et al., "MEEF as a Matrix," *Proceedings of SPIE: 21st Annual BACUS Symposium on Photomask Technology*, vol. 4562, pp. 980-991 (Oct. 2-5, 2001).

Granik et al., "Two-Dimensional G-MEEF Theory and Applications," *Proceedings of SPIE: Symposium on Photomask and Next-Generation Lithography Mask Technology IX*, vol. 4754, pp. 146-155 (Apr. 23-25, 2002).

Granik et al., "Universal process modeling with VTRE for OPC," *Proceedings of SPIE: Optical Microlithography XV*, vol. 4691, pp. 377-394 (Mar. 5, 2002).

Gupta et al., "Manufacturing-Aware Physical Design," *Computer Aided Design*, pp. 681-687 (Nov. 9-13, 2003).

Hajj, Intel's AMT enables rapid processing and info-turn for Intel's DFM test chip vehicle, *Proc. SPIE*, vol. 6730, pp. 67300Q-1 through 67300Q-13 (2007).

Hong et al., "Impact of Process Variance on 65 nm Across-Chip Linewidth Variation," *Proceedings of SPIE: Design and Process Integration for Microelectronic Manufacturing IV*, vol. 6156, pp. 61560Q1-9 (Feb. 23, 2006).

Hoppe et al., "Beyond rule-based physical verification," *Proc. SPIE*, vol. 6349, pp. 63494X.-1 through 63494X-9 (2006).

Li et al., "Transferring Optical Proximity Correction (OPC) Effect into Optical Mode," *Int'l Symp. on Quality Electronic Design*, pp. 771-775 (Mar. 26-28, 2007).

Liebmann, "Layout Impact of Resolution Enhancement Techniques: Impediment or Opportunity?" *Proceedings of the 2003 International Symposium on Physical Design*, pp. 110-117 (Apr. 6-9, 2003).

Lucas et al., "Reticle Enhancement Verification for 65 nm and 45 nm Nodes," *Proceedings of SPIE: Design and Process Integration for Microelectronic Manufacturing IV*, vol. 6156, pp. 61560Q1-9 (Feb. 23, 2006).

Luk-Pat et al., "Correcting Lithography Hot Spots during Physical-Design Implementation," *Proceedings of SPIE: Photomask Technology 2006*, vol. 6349, p. 634920-1 through 634920-9 (Sep. 19, 2006).

Maurer et al., "Evaluation of a Fast and Flexible OPC Package: OPTISSIMO," *Proceedings of SPIE: 16th Annual Symposium on Photomask Technology and Management*, vol. 2884, pp. 412-418 (Sep. 18-20, 1996).

Maurer et al., "Process Proximity Correction Using an Automated Software Tool," *Proceedings of SPIE: Optical Microlithography XI*, vol. 3334, pp. 245-253 (Feb. 22-27, 1998).

Mentor Graphics Corporation, News and Views, "DSM Verification and Analysis," including a partial translation, 7 pp. (document marked Mar. 1999).

Mentor Graphics Corporation, News and Views, "OPC," including a partial translation, 11 pp. (document marked Mar. 1999).

Mentor Graphics Corporation, News and Views, "Calibre," including a partial translation, 9 pp. (document marked Apr. 2000).

Ohnuma et al., "Lithography Computer Aided Design Technology for Embedded Memory in Logic," *Japanese Journal of Applied Physics*, vol. 37(12B), pp. 6686-6688 (Dec. 1998).

Pack et al., "Physical and Timing Verification of Subwavelength-Scale Designs—Part I: Lithography Impact on MOSFETs," *Proceedings of SPIE: Design and Process Integration for Microelectronic Manufacturing*, vol. 5042, pp. 51-62 (Feb. 27, 2003).

Pan, "Lithography-Aware Physical Design," *ASIC*, pp. 35-36 (Oct. 24-27, 2005).

Perry et al., "Model-based approach for design verification and co-optimization of catastrophic and parametric-related defects due to systematic manufacturing variations," *Proc. SPIE*, vol. 6521, pp. 65210E-1 through 65210E-10 (2007).

Philipsen et al., "Printability of Hard and Soft Defects in 193-nm Lithography," *Proceedings of SPIE: 18th European Conference on Mask Technology for Integrated Circuits and Microcomponents*, vol. 4764, pp. 95-112 (Jan. 15, 2002).

Pikus et al., "Non-uniform Yield Optimization for Integrated Circuit Layout," *Proceedings of SPIE: Photomask Technology*, vol. 6730, pp. 67300Y-1 through 67300Y-12 (Sep. 18, 2007).

Rieger et al., "Anticipating and Controlling Mask Costs within EDA Physical Design," *Proceedings of SPIE: Photomask and Next-Generation Lithography Mask Technology X*, vol. 5130, pp. 617-627 (Apr. 16, 2003).

Schacht et al., "Calibration of OPC Models for Multiple Focus Conditions," *Proceedings of SPIE: Optical Microlithography XVII*, vol. 5377, pp. 691-703 (Feb. 24, 2004).

Scheffer, "Physical CAD Changes to Incorporate Design for Lithography and Manufacturability," *Proceedings of the 2004 Conference on Asia South Pacific Design Automation*, pp. 768-773 (Jan. 27-30, 2004).

Schellenberg, "Sub-Wavelength Lithography Using OPC," *Semiconductor Fabtech*, 9th ed., pp. 205-209 (Mar. 1999).

Sturtevant et al., "Assessing the Impact of Real World Manufacturing Lithography Variations on Post-OPC CD Control," *Proceedings of SPIE: Design and Process Integration for Microelectronic Manufacturing III*, vol. 5756, pp. 240-254 (Mar. 4, 2005).

Sturtevant et al., "Considerations for the Use of Defocus Models for OPC," *Proceedings of SPIE: Design and Process Integration for Microelectronic Manufacturing III*, vol. 5756, pp. 427-436 (Mar. 4, 2005).

Tawfic et al., "Feedback Flow to Improve Model-Based OPC Calibration Test Pattern," *Proceedings of SPIE: Design for Manufacturability through Design-Process Integration*, vol. 6521, pp. 65211J-1 through 65211J-9 (Feb. 28, 2007).

Torres et al., "Contrast-Based Assist Feature Optimization," *Proceedings of SPIE: Optical Microlithography XV*, vol. 4691, pp. 179-187 (Mar. 5, 2002).

Torres et al., "Design Verification Flow for Model-Assisted Double Dipole Decomposition," *Proceedings of SPIE: Optical Microlithography XV*, vol. 4691, pp. 585-592 (Mar. 5, 2002).

Torres, "Fast LFD: Description, Availability and Considerations," Mentor User's Meeting at SPIE Advanced Lithography, 27 pp. (Feb. 26, 2007).

Torres et al., "Integrated Circuit DFM Framework for Deep Sub-Wavelength Processes," *Proceedings of SPIE: Design and Process Integration for Microelectronic Manufacturing III*, vol. 5756, pp. 39-50 (Mar. 4, 2005).

Torres, "Integrated Circuit Layout Design Methodology for Deep Sub-Wavelength Processes," Ph.D. Thesis, Oregon Health and Science University, 68 pp. (Mar. 2005).

Torres et al., "Layout verification in the era of process uncertainty: Requirements for Speed, Accuracy and Process Portability," *BACUS Photomask*, 20 pp. (Sep. 20, 2007).

Torres et al., "Layout verification in the era of process uncertainty: Requirements for Speed, Accuracy, and Process Portability," *Proc. SPIE*, vol. 6730, pp. 67300U-1 through 67300U-9 (published online Oct. 30, 2007).

Torres, "Layout verification in the era of process uncertainty: Target Process Variability Bands Vs Actual Process Variability Bands," *Proc. SPIE*, vol. 6925, pp. 692509-1 through 692509-8 (published online Mar. 4, 2008).

Torres et al., "Model Assisted Double Dipole Decomposition," *Proceedings of SPIE: Optical Microlithography XV*, vol. 4691, pp. 407-417 (Mar. 5, 2002).

Tones et al., "Process Window Modeling Using Compact Models," *Proceedings of SPIE: 24th Annual BACUS Symposium on Photomask Technology*, vol. 5567, pp. 638-648 (Sep. 14, 2004).

Torres et al. "RET-Compliant Cell Generation for Sub-130 nm Processes," *Proceedings of SPIE: Optical Microlithography XV*, vol. 4691, pp. 529-539 (Mar. 5, 2002).

Torres, "Towards Manufacturability Closure: Process Variations and Layout Design," *Electronic Design Process Symposium*, 7 pp. (Apr. 7-8, 2005).

Torres et al., "Unified Process Aware System for Circuit Layout Verification," *Proceedings of SPIE: Design for Manufacturability through Design-Process Integration*, vol. 6521, pp. 652108-1 through 652108-12 (Feb. 28, 2007).

Tsai et al., "Modeling Litho-Constrained Design Layout," *Design Automation Conference*, pp. 354-357 (Jun. 4-8, 2007).

Vasek et al., "SEM-Contour Based Mask Modeling," *Proceedings of SPIE: Optical Lithography XXI*, vol. 6924, pp. 69244Q-1 through 69244Q-11 (Feb. 26, 2008).

Vasek et al., "SEM-contour-based OPC Model Calibration through the Process Window," *Proceedings of SPIE: Metrology, Inspection, and Process Control for Microlithography XXI*, pp. 65180D-1 through 65180D-10 (Feb. 26, 2007).

Word et al. "Advanced Layout Fragmentation and Simulation Schemes for Model Based OPC," *Proceedings of SPIE: Optical Microlithography XVIII*, vol. 5754, pp. 1159-1168 (Mar. 1, 2005).

Word et al., "Lithography Yield Enhancement through Optical Rule Checking," *Proceedings of SPIE: Advanced Microlithography Technologies*, vol. 5645, pp. 142-153 (Nov. 8, 2004).

Yehia et al., "Simultaneous Model-Based Main Feature and SRAF Optimization for 2D SRAF Implementation to 32 nm Critical Layers," *Proceedings of SPIE: Photomask Technology*, vol. 6730, pp. 67302K-1 through 67302K-10 (Sep. 18, 2007).

Yenikaya et al., "A rigorous method to determine printability of a target layout," *Proc. SPIE*, vol. 6521, pp. 652112-1 through 652112-12 (2007).

* cited by examiner

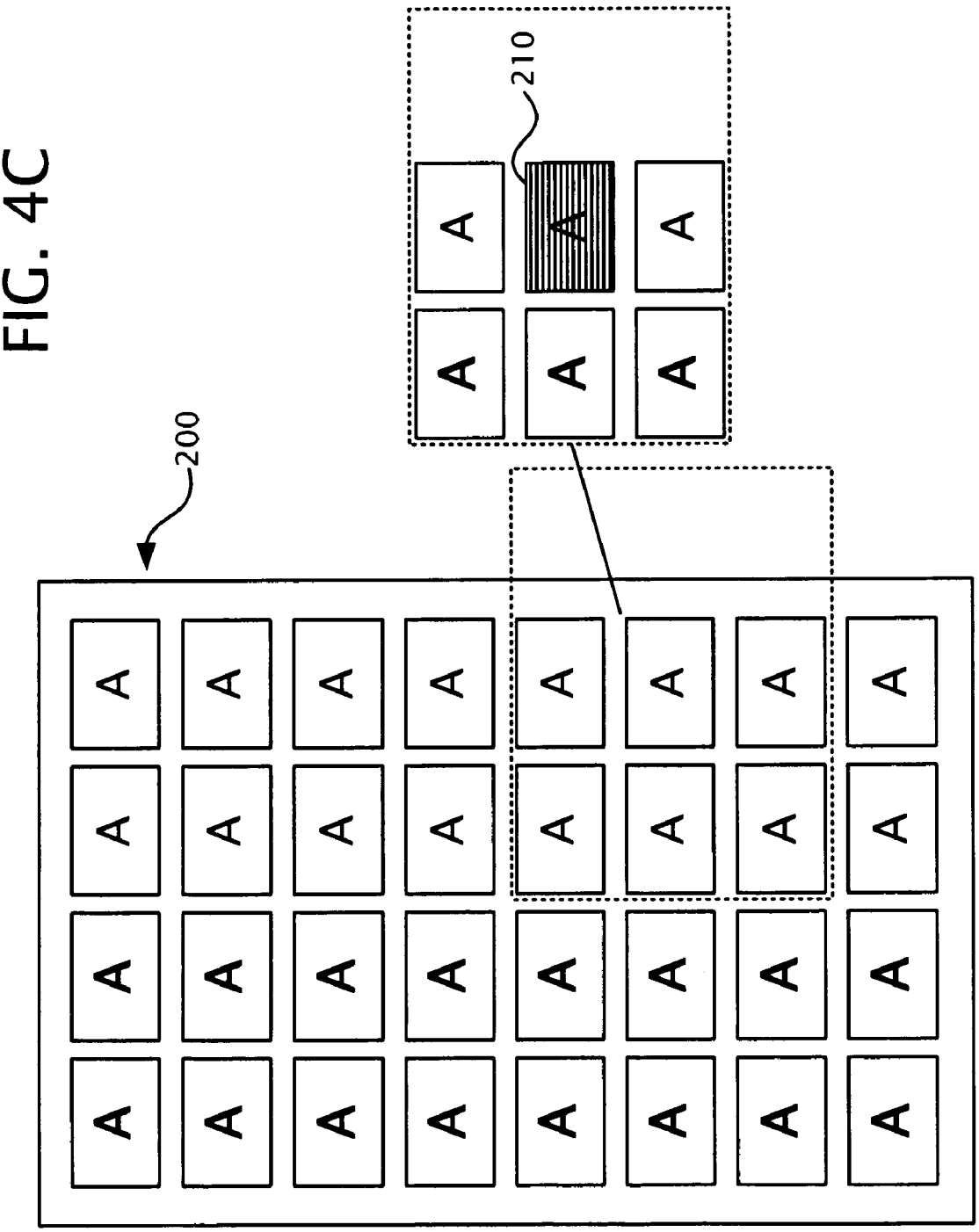

ANALYSIS OPTIMIZER

CROSS REFERENCE TO RELATED APPLICATION

This Application claims the benefit of priority under 35 U.S.C. §119 to U.S. Provisional Application No. 60/857,958 filed on Nov. 9, 2006, which is incorporated herein by reference in its entirety.

FIELD

The technology disclosed herein relates to methods for preparing design data for manufacturing, and in particular, to methods for determining if features of a target layout of an integrated circuit will print correctly on a wafer when designated photolithographic manufacturing techniques are used.

BACKGROUND

In conventional photolithographic processing, an integrated circuit (IC) is created by printing a pattern of features defined on a mask or reticle onto a semiconductor wafer that is coated with photosensitive materials. The printed wafer is then chemically and mechanically processed to create various circuit components having shapes corresponding to those of the printed features. The wafer is then re-coated with another layer of photosensitive materials and the process continues to build various layers of the integrated circuit.

As the size or spacing of the features to be printed on the wafer becomes smaller than the wavelength of light used to print a pattern of features onto the semiconductor wafer, optical and other process distortions occur such that the pattern that is actually printed on the wafer may not match the desired target pattern. As a result, numerous resolution enhancement techniques have been developed to improve the fidelity with which a target pattern of features can be printed on a wafer. Examples of resolution enhancement techniques include optical and process correction (OPC), sub-resolution assist features (SRAFs) and phase shift masks.

Additional techniques can be used to verify that a desired target pattern will print on a wafer. These techniques, sometimes called design for manufacturing (DFM) techniques, sometimes called "hotspot" detection techniques, or sometimes referred to as lithography friendly design (LFD) methods, analyze a proposed circuit layout to ensure that the features will print correctly under a variety of different process conditions. These conditions will be specific for the manufacturing process selected, and can include variations in the dose and focus of the light that will be used to expose the pattern onto a wafer. After such an analysis, a circuit designer is alerted to the areas or particular features within the design that may not be properly manufactured.

One approach to this analysis is to use a process model of some sort to estimate the appearance of the pattern on the wafer. This model is often calibrated to the behavior of a particular process or tool set, and encoded into software that allows rapid computation of the pattern on the wafer under the many variations of process conditions that may be reasonably expected.

If the model used in this approach is accurate, this can be almost assured of finding all the locations which may prove to be a problem for manufacturing. This rigorous analysis therefore represents a very reliable approach to detecting problems areas in an IC layout. However, although advances have been made in massively parallel computing that may allow simultaneous computation for many process conditions, this still remains a massive computation job, especially as IC dimensions grow smaller and the sensitivity to process variations grows. To complete a reasonable assessment of a layout in a reasonable amount of time with this full model-based treatment remains a challenge.

One approach to improve the speed of analysis is to use "libraries" of known problems. Here, the proposed circuit layout is analyzed by comparing the feature pattern of a target layout to a database library of known patterns that do not print correctly. The defective patterns are most often detected by a fabrication facility based on test patterns that are printed or from actual experience printing other similar circuits, but can also be simulated using a calibrated process model. As more defective patterns are detected under a variety of conditions, the database becomes increasingly large and the time required to confirm the manufacturability of a layout by comparison against this ever growing library can be take several days or longer using a high speed or networked computer system. Furthermore, it is possible that a new circuit layout will include features that will fail, but have not previously been detected and included in the database library. Therefore, even if a "hotspot" analysis is performed on a circuit layout, there is no guarantee that all errors can be found, and that all the features in the layout will print as desired.

SUMMARY

To address these and other concerns, the technology disclosed herein relates to a method of analyzing a set of target layout data to determine if the features of the target layout will print correctly on a wafer. Instead of analyzing all the features in the target layout, the data volume or number of features in the target layout data is reduced by removing features or areas that can be determined to print correctly. Those features or areas of the target layout that remain define a revised set of target layout data that is then subjected to a rigorous analysis.

In one embodiment, the data volume or number of features in the target layout data is reduced by removing features or areas of the target layout that have already been analyzed with an analysis tool or other tool and have been determined to print correctly. In addition, duplicated features or cells of features in the layout data can be removed such that separate analyses do not need to be performed for each instance of the same feature or cell.

In one embodiment, those features that remain in the target layout are fragmented into a number of edge fragments. In one embodiment, each edge fragment is analyzed to determine if it is part of a large feature, is next to a corner or is at a corner of a feature or is within a predetermined distance of another edge fragment. Edge fragments that are part of a large feature, are not at a corner or adjacent to a corner and are not within a predetermined distance of another edge fragment are removed from the target layout.

In one embodiment, the remaining edge fragments in the target layout are analyzed with an optical and process correction (OPC) tool. The OPC corrected edge fragments are analyzed to determine the sensitivity of an edge placement error (EPE) to process variations such as variations in dose and focus. Edge fragments having an EPE that is sensitive to process variations are analyzed with an LFD tool or other analysis tool to determine if the corresponding features of which the edge fragments are a part will print correctly on the wafer.

Any edge fragments that are determined to likely print incorrectly may be provided to a circuit designer in the form of an error list.

BRIEF DESCRIPTION OF THE DRAWINGS

The foregoing and other objects, features, and advantages of the invention will become more apparent from the following detailed description, which proceeds with reference to the accompanying figures, wherein:

FIGS. 4A-4G illustrate techniques for analyzing replicated features in a target layout according to an embodiment of the disclosed technology.

DETAILED DESCRIPTION

Figure 1:
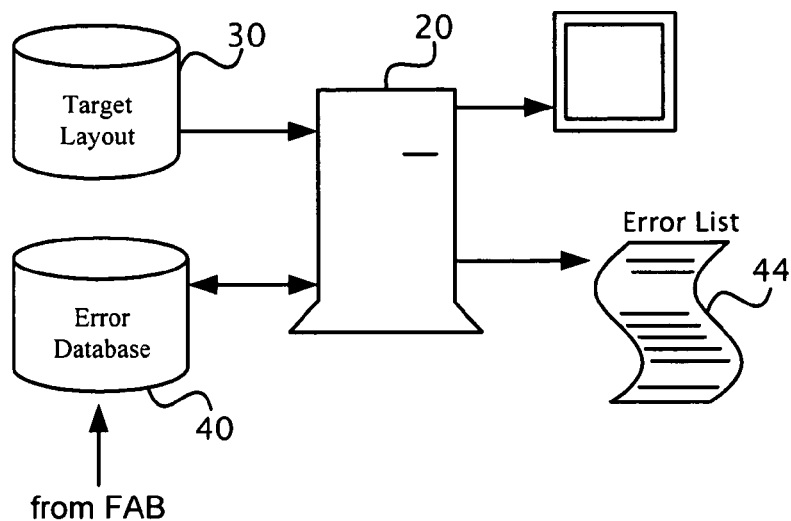
FIG. 1 illustrates a conventional system for performing a "hotspot" analysis.

FIG. 1 illustrates a conventional system for performing a lithographic "hotspot" analysis on a target layout. A computer system 20 receives a set of target layout data 30. The target layout data 30 is typically stored in a database in a layout description language such as GDS-II or OASIS. To perform the analysis, the computer system 20 also accesses an error database 40 that includes descriptions of feature patterns that are known to print incorrectly on a wafer under various process conditions. Typically, the error database 40 is populated with information received from a fabrication facility, but can also include data generated from simulation models. The computer system 20 then compares the feature patterns of the target layout data 30 with the feature patterns defined in the error database 40 to determine if the features of the target layout will print correctly on a wafer. Those feature patterns of the target layout that match the feature patterns in the error database 40 are used to produce an error list 44, which may be in physical or electronic form. The error list 44 can be reviewed by the circuit designer to either change the configuration of the target layout or the conditions under which the target layout will be printed so that circuits can be manufactured as desired.

Figure 2:
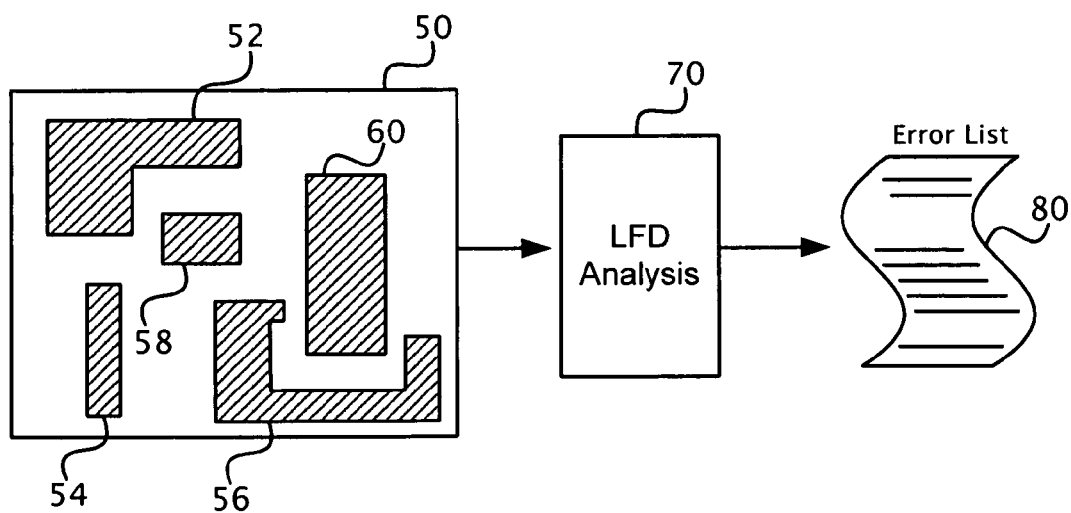
FIG. 2 illustrates a technique for performing an LFD or other photolithographic analysis in accordance with one embodiment of the disclosed technology.

FIG. 2 illustrates a system for performing an LFD or other photolithographic analysis on a target layout in accordance with one embodiment of the disclosed technology. In this embodiment, the computer system 20 receives a set of target layout data 50 or portion thereof that defines a number of features to be printed on a wafer. In order to reduce the time required to perform the LFD analysis, areas or features in the target layout that are known to print correctly are removed from the target layout to define a revised target layout on which the LFD analysis is performed. In addition, duplicates of features that are defined in the target layout are removed prior to performing the analysis. Finally, those features that are positioned far away from other features or are otherwise sufficiently robust such that they will print correctly are removed prior to performing the analysis. In the example shown, individual features or areas including groups of features 52-56 are removed from the target layout to create the revised target layout prior to performing the LFD analysis. Features 58 and 60 remain in the target layout for analysis by one or more photolithographic tools such as an LFD analysis 70, which is used to produce electronic or physical error list 80. It should be noted that, since the revised target layout is considerably smaller, the more rigorous, full model-based analysis techniques, which are impractical on the full layout, can now be executed in a reasonable amount of time.

Figure 3A:
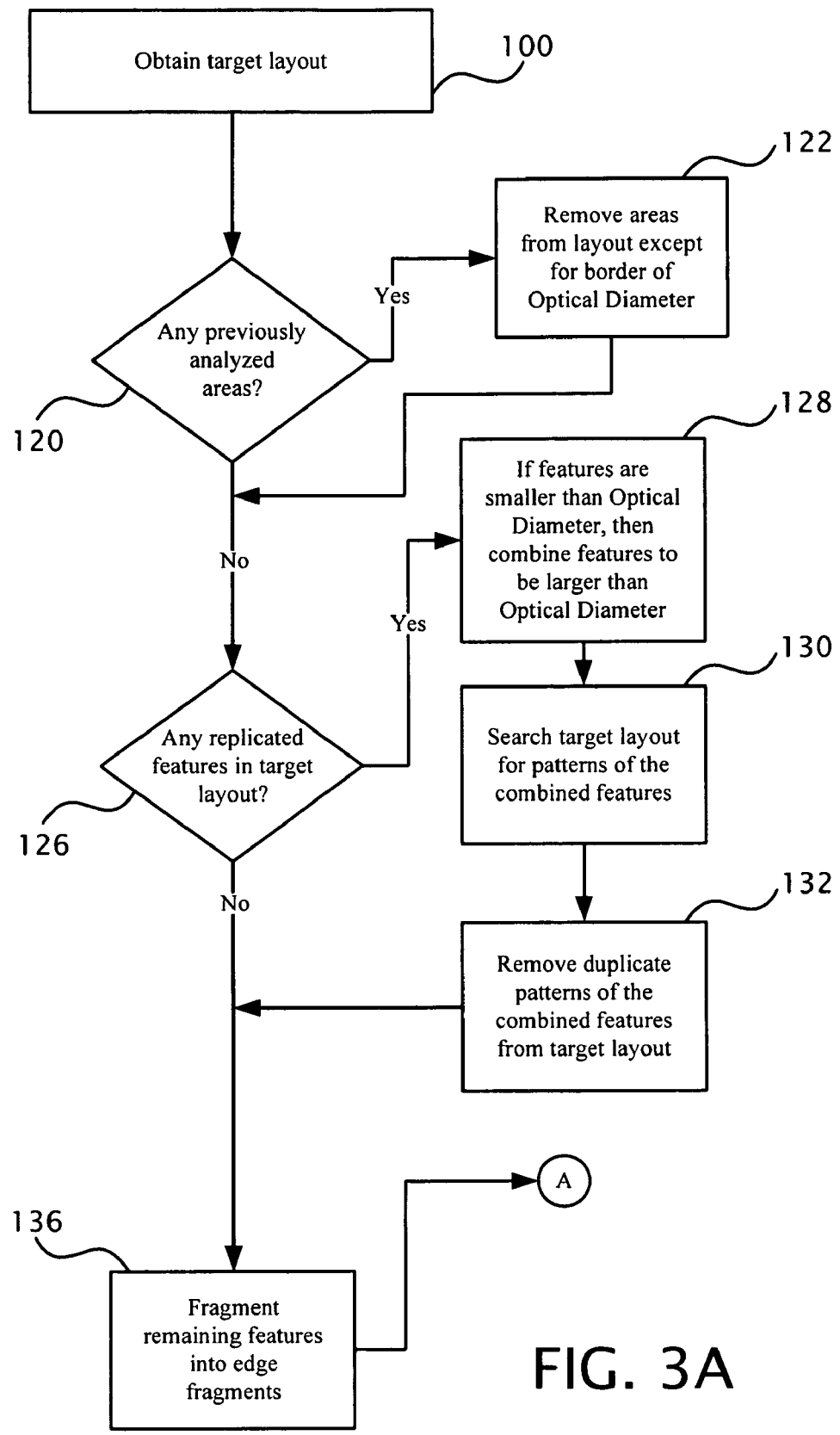
FIGS. 3A-3C are flowcharts of acts performed in accordance with one embodiment of the disclosed technology to perform an LFD analysis on a target layout.
Figure 3B:
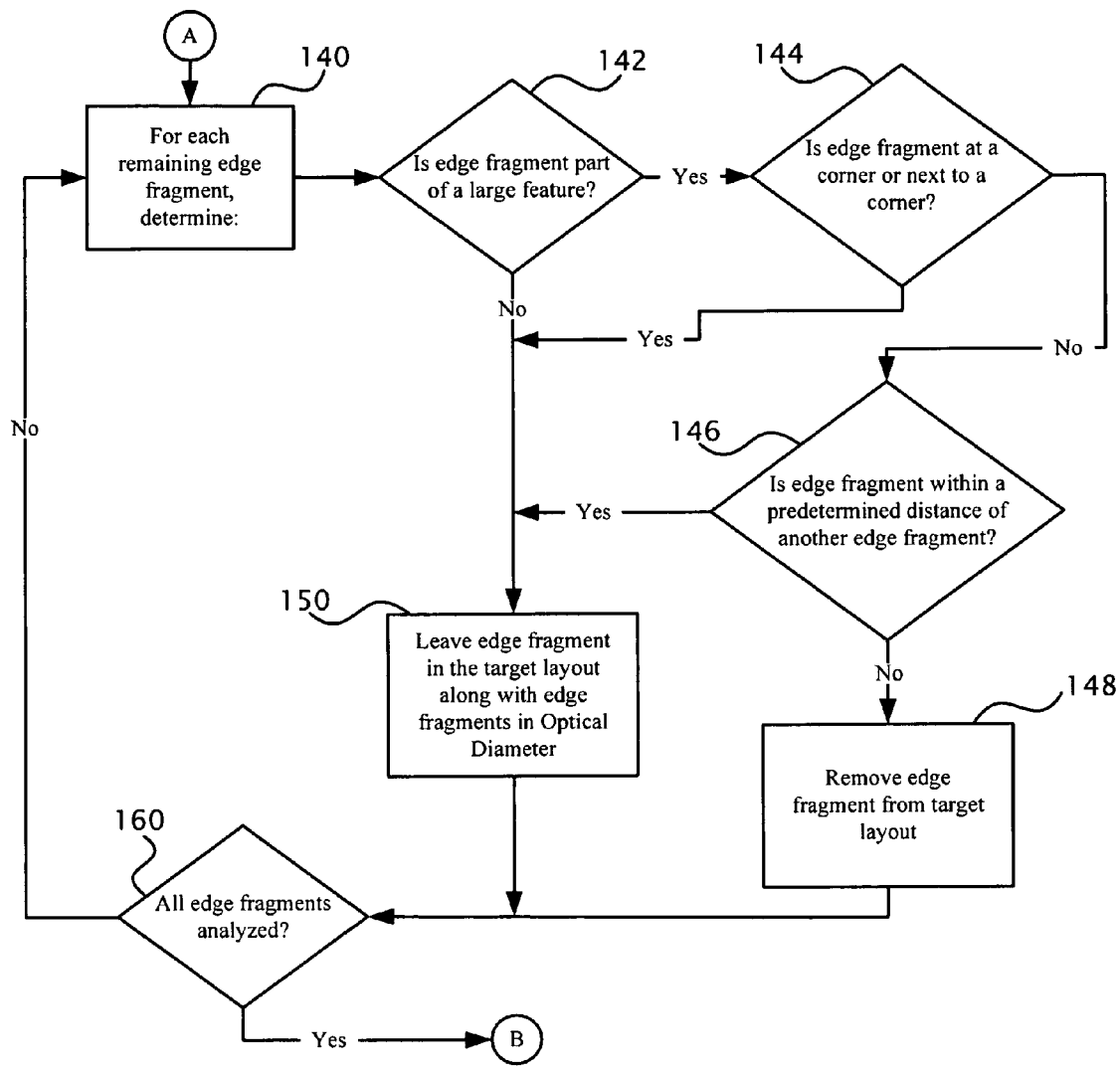
Figure 3C:
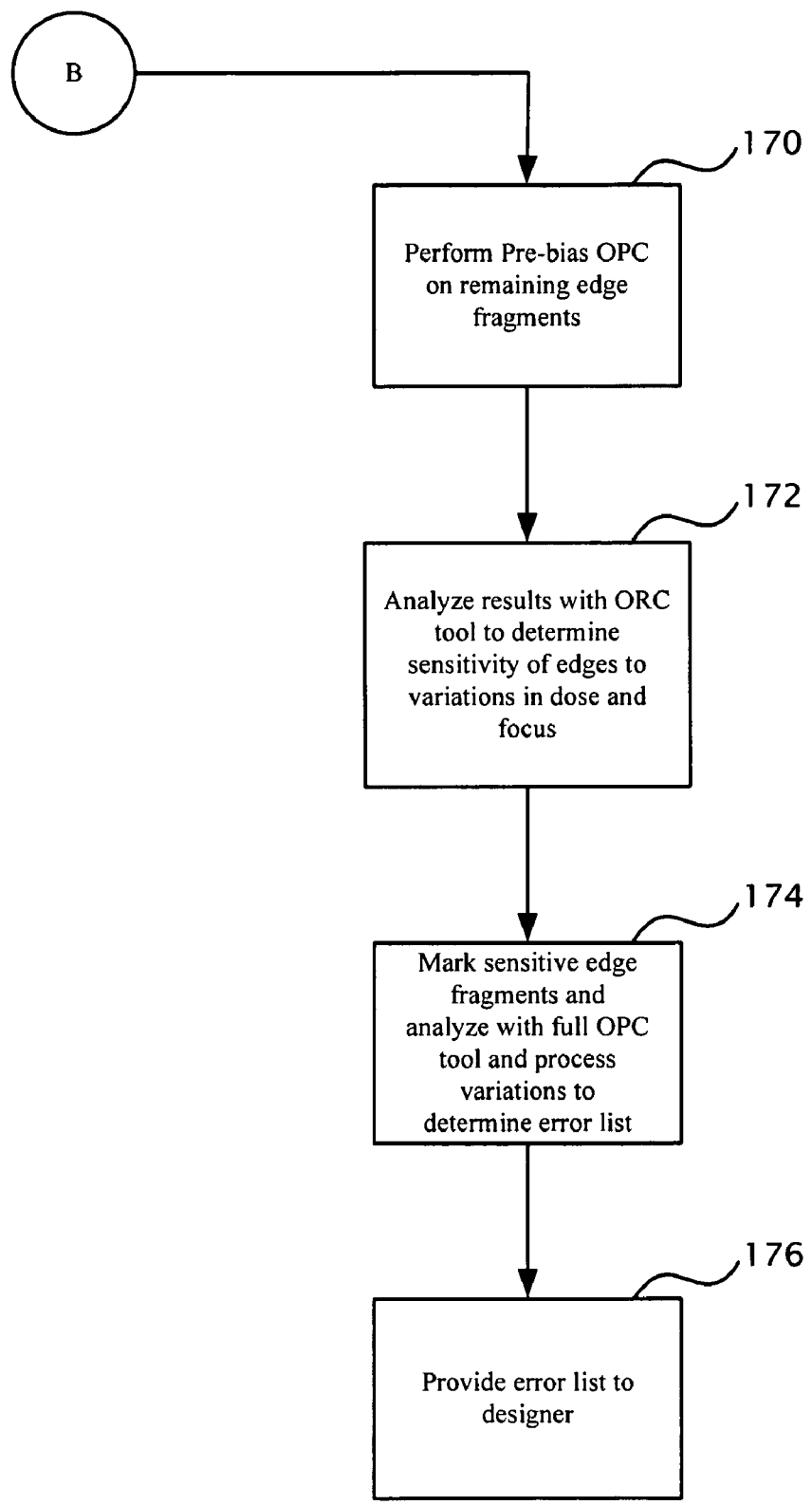

FIGS. 3A-3C are flow charts of acts performed in accordance with one embodiment of the disclosed technology to prepare a revised target layout prior to performing an LFD analysis. Although the acts are illustrated in a particular order, it will be appreciated that the acts may be performed in different orders while still achieving the functionality described. In addition, not all the acts described need to be performed in order to achieve the benefits of the disclosed technology. Also, although the disclosed embodiments of the technology are described as being carried out for use with an LFD analysis, these layout data reduction techniques could be applied for use with other analysis tools.

A computer system executes a sequence of programmed instructions contained on a computer storage medium (CD-ROM, hard drive, DVD etc.) or received over a computer communication link such as the Internet, to create the revised target layout for photolithographic analysis. Beginning at 100, an original set of target layout data or portion thereof is received by the computer system on a computer storage medium (CD-ROM, hard drive etc. or from a computer communication link such as a wired or wireless computer communication link including the Internet etc.). At 120, it is determined whether any features or areas of the target layout have been previously subjected to an LFD analysis or another type of photolithographic analysis that confirms that the features will print as desired. If so, those previously analyzed features or areas are removed from the target layout.

In one embodiment, if a feature or group of features is removed from the target layout, a border area that extends inwardly of the boundaries of the features or area to be removed is maintained in the revised target layout in order to provide local context for the features that remain. In one embodiment, the border area has a width of one optical diameter of the photolithographic processing system to be used to print the target layout.

At 126, it is determined if there are any replicated features in the target layout. In one embodiment, replicated features having a size that is smaller than the optical diameter of the photolithographic process are combined such that the combined features have a size that is as large as, or larger than, the optical diameter. At 130, a search is performed in the target layout for patterns of features matching the combined replicated features. Duplicate patterns of the combined features are removed from the target layout at 132.

Figure 4A:
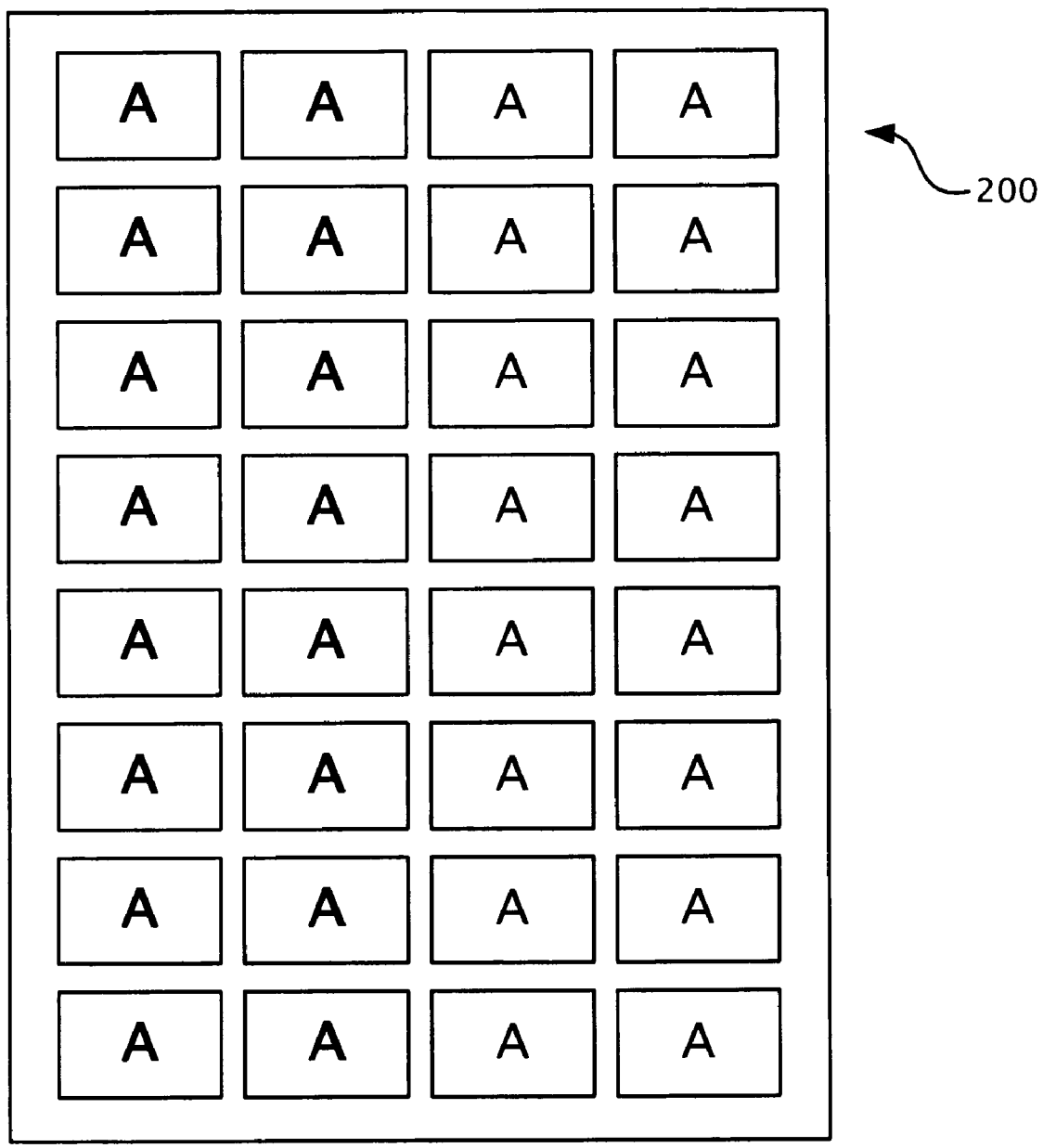
Figure 4B:
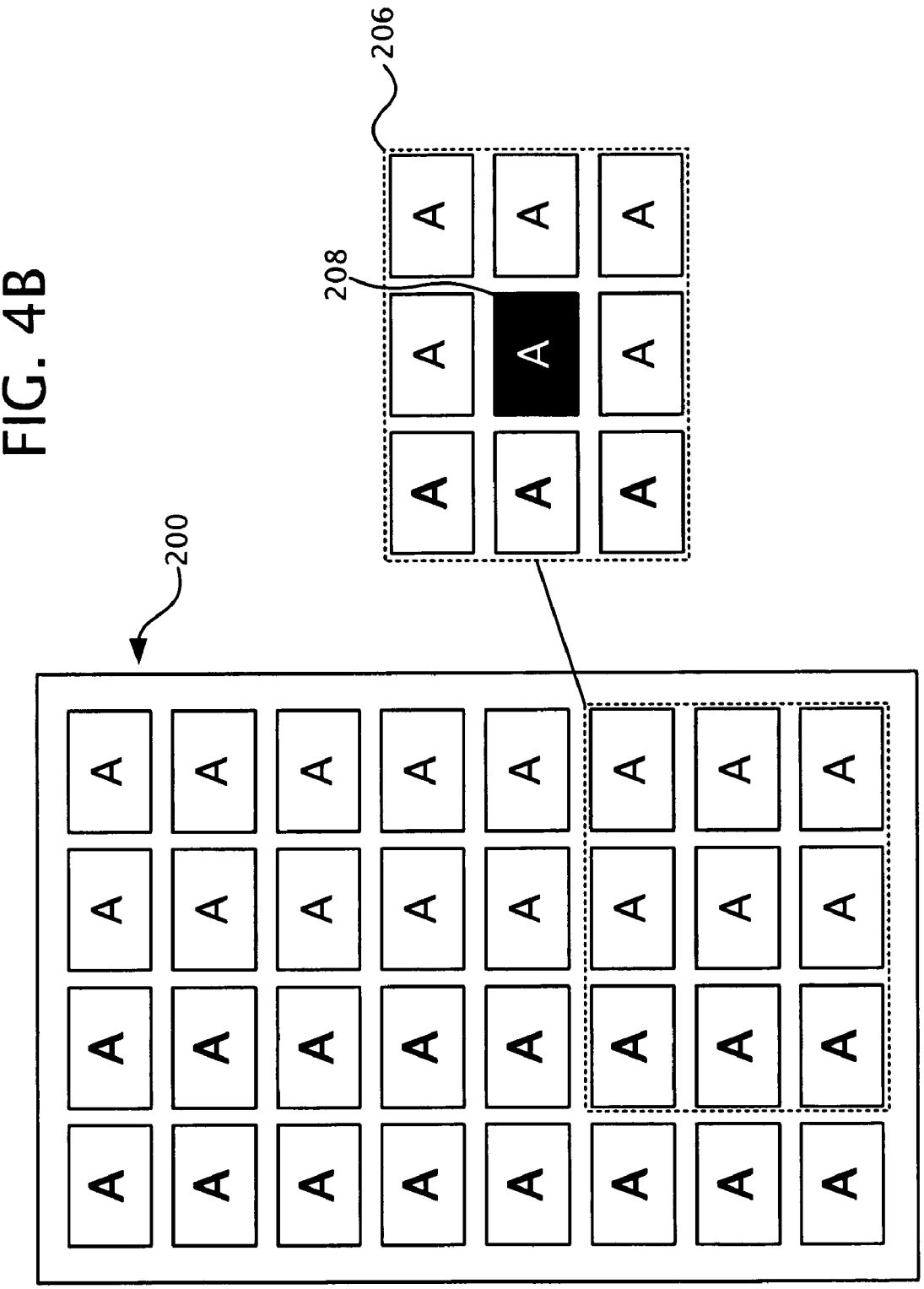

FIG. 4A illustrates a 4×8 array 200 of a number of identical replicated features "A" in a target layout. To avoid performing the LFD analysis for each of the 32 instances of feature A, the duplicate entries can be removed from consideration. FIG. 4B illustrates a 3×3 sub-array 206 within the larger the array 200. The sub-array 206 includes a central instance of feature A 208 that is surrounded on all sides by similar features. In the example shown, the array 200 includes twelve instances of the feature A 208 that are surrounded by identical features. Therefore, the LFD analysis of one instance of feature A 208 can be performed and used for the remaining eleven instances of feature A 208.

In FIG. 4C illustrates an instance of feature A 210 that is located on a side of the array 200 and is bounded on three sides by similar features. In the example shown, there are six identical instances of a feature 210 in the array 200. The analysis performed for one instance of the feature 210 can be repeated for the additional five instances of feature 210.

Figure 4D:
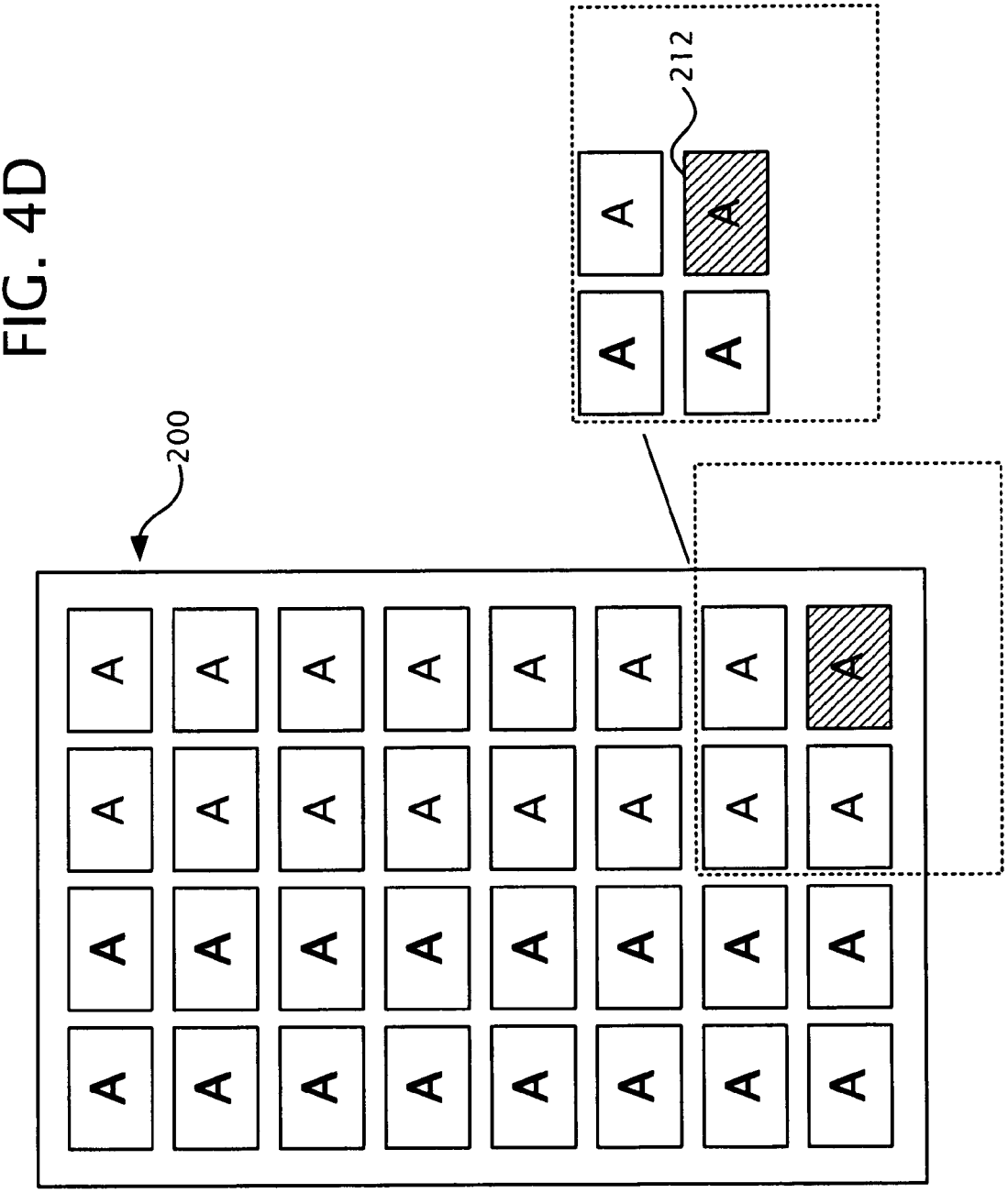

FIG. 4D illustrates an instance of a feature A 212 at a corner of the array 200. In the example shown, there are four unique instances of a corner feature, each of which is analyzed separately.

Figure 4E:
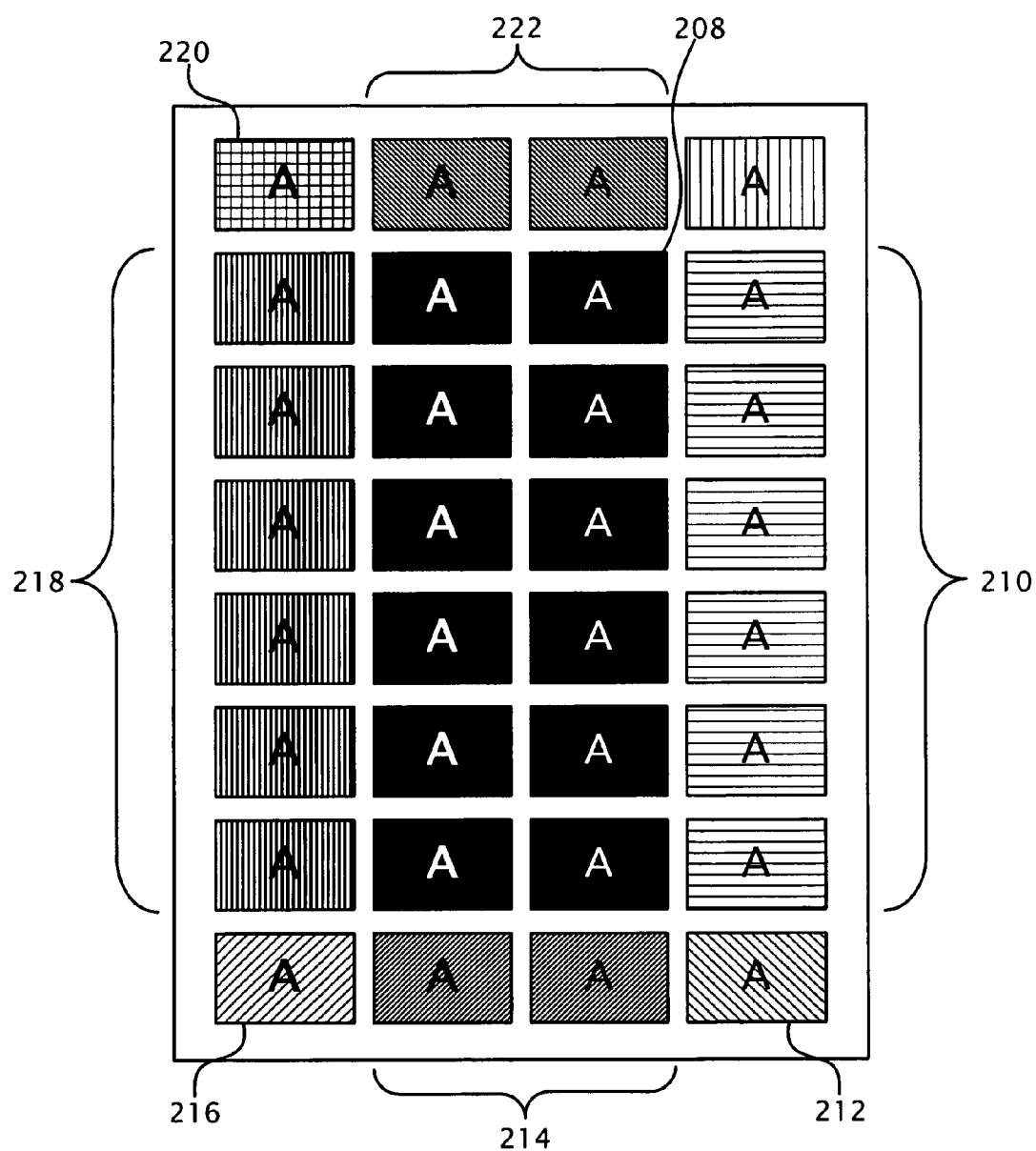

FIG. 4E illustrates the similar features 208, 210, 212, 214, 216, 218, 220, 222 that are present in the array 200. For any 3×3 or larger array there is a minimum of nine separate instances of a replicated feature that need to be analyzed. In the example shown, the number of features in the array 200 that are subjected to the LFD analysis can be reduced from 32 features to 9 features.

Figure 4F:
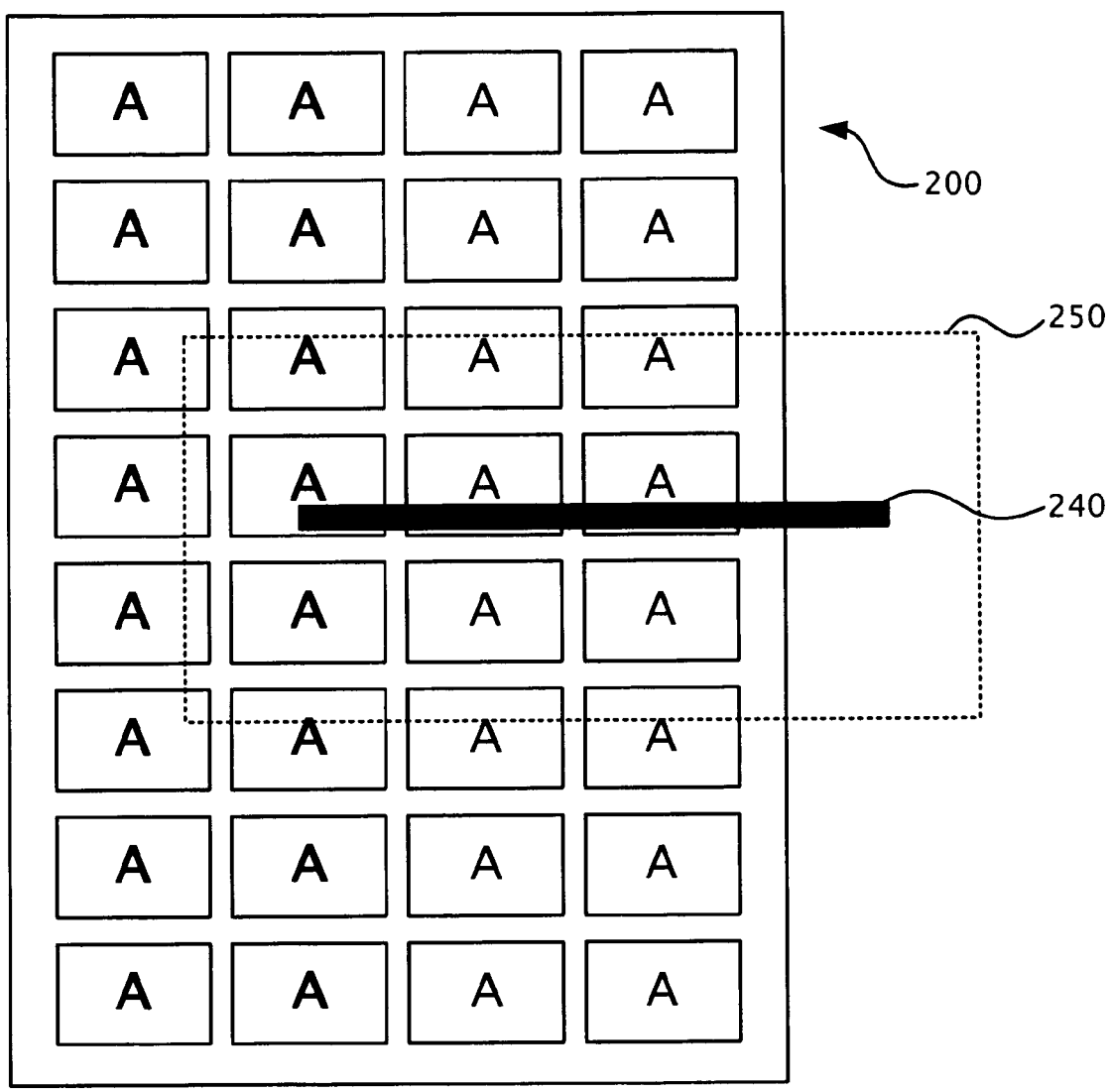

FIG. 4F illustrates one technique for analyzing an additional feature 240 that interacts with features in the array 200. To compensate for the local interaction, a boundary box 250 is determined that extends outwardly from the feature 240 by a predefined distance such as the optical diameter of the photolithographic system (boundary box 250 is not drawn to scale). In the example shown, the boundary box 250 encompasses 16 instances of the features A in the array 200. Any instance of a feature that lies wholly or partially within the boundary box 250 is separately analyzed. In the example shown, the LFD analysis of the array 200 can be completed by analyzing the 9 different instances of feature A plus the 16 instances that are within the boundary box 250 of the feature 240 for a total of 25 analyses that are performed. However, this is still an improvement from separately analyzing each of the 32 instances of feature A.

Figure 4G:
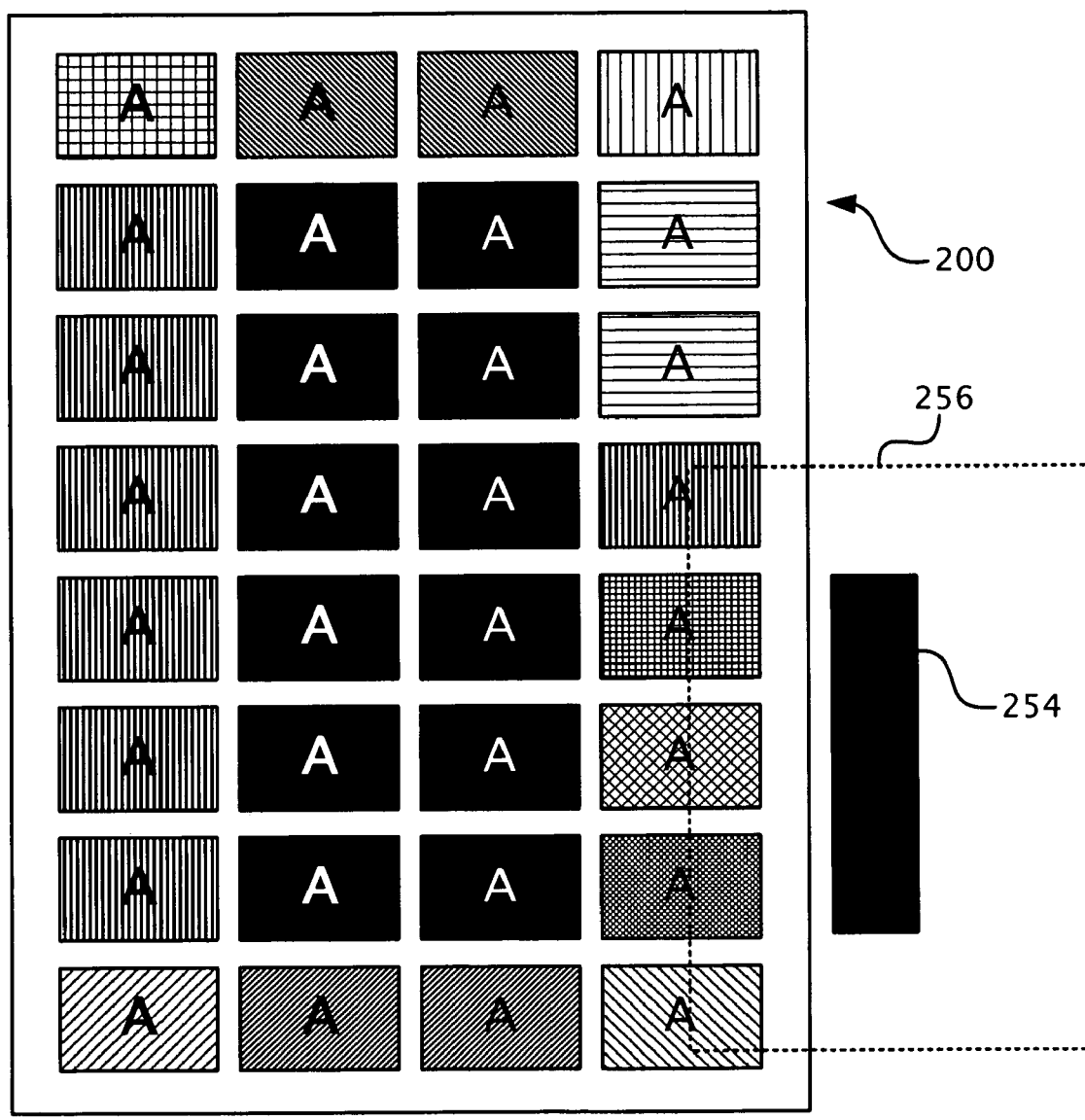

FIG. 4G illustrates an example where a feature 254 is adjacent the array 200. In this example, a boundary box 256 is drawn extending outwardly from the feature 254 and wholly or partially encompasses five instances of feature A from the array 200. In this example, the analysis of the replicated features can be performed with 8 instances of features that are not within the boundary box 256 surrounding the feature 254 plus the analyses of the 5 features that are within the boundary box 256 for a total of 13 analyses that are to be performed.

In the example shown, it is assumed that each feature A is larger than some predetermined size such as being as large as, or larger than, the optical diameter of the photolithographic printing system. In one embodiment, if the replicated features have a size that is smaller than the predetermined size, the features may be combined to have a size larger than the predetermined size.

Returning now to FIG. 3A, the features that remain in the target layout are fragmented into a number of edge fragments at 136. Typically the features in the layout database are stored as a sequence of vertices that define the borders of polygons. Fragmentation is performed by adding additional vertices or fragmentation endpoints so that the size of the individual edge fragments that extend around the perimeters of the polygons is reduced. Each edge fragment is typically associated with a simulation site at which various printing parameters are determined.

At 140, each remaining edge fragment in the target layout is analyzed. At 142 it is determined if an edge fragment is part of a large feature i.e. a feature having a length or width (or both) that is greater than some defined minimum. Those edge fragments that are part of a large feature are marked as "large" features. What constitutes a large feature may be process defined or user selected. If the answer to 142 is yes, it is determined if the edge fragment is at a corner of a feature or is adjacent to a corner of the feature at 144. If the edge fragment is not next to a corner or at a corner, is determined whether the edge fragment is within a predetermined distance another edge fragment at 146. If the answer to 146 is no, then the edge fragment is removed from the target layout.

Figure 5:
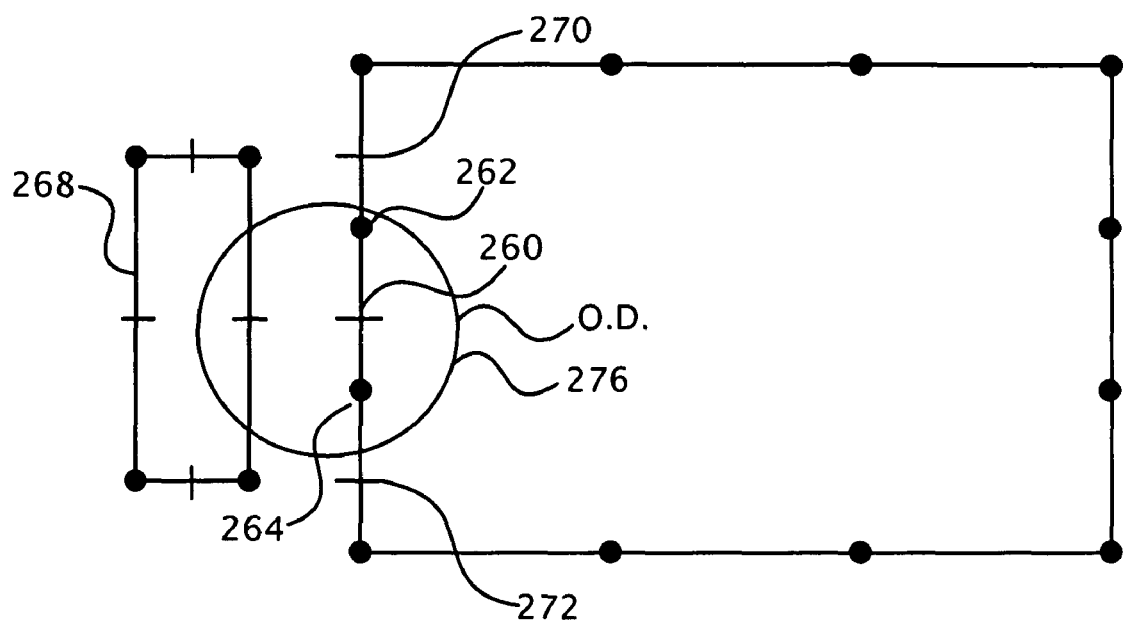
FIG. 5 illustrates edge fragments of a target layout that are within a predetermined distance of each other.

If an edge fragment is not part of a large feature, is at or adjacent to a corner of a feature or is within a predetermined distance of another edge fragment, the edge fragment is left in the revised target layout along with any edge fragments that are within an optical diameter of the edge fragment. FIG. 5 illustrates an edge fragment 260 defined between fragmentation endpoints 262, 264 that is included in the revised target layout. In addition, edge fragments 268, 270 and 272 are also included in the revised target layout because these edge fragments are within an optical diameter 276 of the edge fragment 260.

Again returning to FIG. 3B, it is determined if all edge fragments have been analyzed at 160. If not, processing returns to 130 until each edge fragment has been analyzed. At 170, those edge fragments that remain in the target layout are subjected to an optical and process correction (OPC) analysis in order to adjust the position of the edge fragments and improve the fidelity with which they will print on a wafer. In one embodiment, the optical and process correction uses a pre-bias optical and process correction technique as described in U.S. patent application Ser. No. 11/673,515, filed Feb. 9, 2007, which is herein incorporated by reference. The pre-bias OPC technique produces an OPC solution for each edge fragment that is close to that obtained with a more rigorous OPC analysis but takes less time to compute. However, if time and processing power permit, a more rigorous OPC analysis can be performed.

After the OPC analysis, the position of where the edge fragments will print on the wafer is determined. In one embodiment, the edge fragments are analyzed with an optical rule checking (ORC) tool to compute the edge's edge placement error (EPE) i.e. the difference between where the edge fragment will actually print on a wafer versus its intended printing position. In addition, a determination is made of how sensitive the EPE is to variations in certain process conditions such as variations dose and focus of the photolithographic printing system. In one embodiment, the sensitivity can be computed by determining EPE at two or more process variations which include but are not limited to dose, defocus and mask bias and then measuring the difference ($\Delta$EPE) between $EPE_{max}$ and $EPE_{min}$.

Other process variations may include variations in illumination pattern or polarization or MEEF (mask error enhancement factor). Edge fragments are deemed not sensitive if they exhibit a $\Delta$EPE with a value smaller than that specified by the user (typically set by the acceptable variation allowed for devices and wires) and also meet a constraint in which the absolute value of both $EPE_{max}$ and $EPE_{min}$ is smaller than user defined EPE threshold reflecting the maximum allowable pattern deviation with respect to the target features. Edge segments that have a small EPE and are insensitive to process variations can be removed from the layout. Those edge segments with a large EPE or that are sensitive to process variations remain in the target layout.

Those sensitive edge fragments that remain in the target layout form the revised target layout that is analyzed with an LFD analysis tool. One example of an LFD analysis tool is described in U.S. Patent Publication 2005/025177A1, assigned to Mentor Graphics Corporation and which is herein incorporated by reference. However, other analysis tools could be used.

If the LFD analysis indicates that an edge fragment will not print as desired, the edge fragment can be marked and included in an error list that is given to the circuit designer at 176 to correct the target layout and/or to vary the process condition parameters.

In view of the many possible embodiments to which the principles of the disclosed invention may be applied, it should be recognized that the illustrated embodiments are only preferred examples of the invention and should not be taken as limiting the scope of the invention. For example, although the disclosed embodiments remove features from the original target layout data to create the revised target layout data prior to performing an LFD or other analysis, it is also possible to mark or tag features and ignore any such tagged or marked feature during the analysis. Conversely, the analysis of the revised layout data could include only features from the original target layout that are tagged or marked. In yet another embodiment, edge fragments are not removed from the target layout but simulation sites for edge fragments are removed so that no analysis by a photolithographic tool takes place for those edge fragments. Therefore, the removal of a feature from a target layout includes both physical removal of the description of a feature or group of features from the target layout and removal from consideration of the features by an analysis tool. Furthermore the disclosed technology is not limited to only applying an LFD analysis on the revised layout. The disclosed technology can also be used to create a revised layout prior to applying other tools such as OPC, ORC or any other photolithographic analysis that takes significant computer time to run.

Therefore, the scope of the invention is defined by the following claims and equivalents thereof.

We claim:

1. A method, comprising:
   with a computer,
      receiving a set of target layout data that defines a number of features to be printed on a wafer,
      revising the target layout data to define a reduced number of the features by removing one or more features that have been determined to print correctly, and
      storing the revised target layout data for use by a photolithographic analysis tool to determine if the features defined by the revised target layout data will print as desired on a wafer.

2. The method of claim 1, wherein the target layout data is revised by determining one or more features in the target layout that are replicated in the target layout and removing duplicates of the replicated features from the target layout data.

3. The method of claim 1, wherein the act of revising the target layout data comprises:
   fragmenting at least one of the features into a number of edge fragments and analyzing each edge fragment to determine if
   1) the edge fragment is part of a feature having a size that is greater than a predefined size;
   2) the edge fragment is at or adjacent a corner of a feature; and
   3) the edge fragment is within a predetermined distance of another feature.

4. The method of claim 3, wherein the act of revising the target layout data further comprises removing an edge fragment from the target layout data if the edge fragment is part of a feature having a size that is greater than the predefined size, is not at or adjacent to a corner of a feature, and is not with a predetermined distance to another feature.

5. The method of claim 1, wherein the act of revising the target layout data comprises:
   fragmenting one or more features in the target layout data into a number of edge fragments; and
   determining an edge placement error (EPE) for the one or more edge fragments.

6. The method of claim 5, further comprising removing edge fragments from the target layout data that have an EPE that is less than an EPE threshold.

7. The method of claim 5, further comprising:
   determining a sensitivity of the EPEs to one or more process variations.

8. The method of claim 7, further comprising removing edge fragments from the target layout data that have an EPE that is less than the predetermined EPE threshold and a sensitivity that is less than an EPE sensitivity threshold.

9. The method of claim 7, wherein the process variations include variations in dose.

10. The method of claim 7, wherein the process variations include variations in focus.

11. The method of claim 7, wherein the process variations include variations in polarization.

12. The method of claim 7, wherein the process variations include variations in illuminator pattern.

13. The method of claim 7, wherein the process variations include variations in MEEF.

14. One or more computer-readable storage devices storing computer-readable instructions that when executed by a computer system cause the computer system to perform a method, the method comprising:
   receiving a set of target layout data that defines a number of features to be printed on a wafer;
   revising the target layout data to define a reduced number of the features by removing one or more features that have been determined to print correctly; and
   storing the revised target layout data for use by a photolithographic analysis tool to determine if the features defined by the revised target layout data will print as desired on a wafer.

15. The computer-readable storage devices of claim 14, wherein the act of revising the target layout data comprises determining one or more features in the target layout that are replicated in the target layout and removing duplicates of the replicated features from the target layout data.

16. The computer-readable storage devices of claim 14, wherein the act of revising the target layout data comprises:
   fragmenting at least one of the features into a number of edge fragments and analyzing each edge fragment to determine if
   1) the edge fragment is part of a feature having a size that is greater than a predefined size;
   2) the edge fragment is at or adjacent a corner of a feature; and
   3) the edge fragment is within a predetermined distance of another feature.

17. The computer-readable storage devices of claim 14, wherein the act of revising the target layout data further comprises removing an edge fragment from the target layout data if the edge fragment is part of a feature having a size that is greater than the predefined size, is not at or adjacent to a corner of a feature, and is not with a predetermined distance to another feature.

18. The computer-readable storage devices of claim 14, wherein the act of revising the target layout data comprises:
   fragmenting one or more features in the target layout data into a number of edge fragments; and
   determining an edge placement error (EPE) for the one or more edge fragments.

19. The computer-readable storage devices of claim 18, wherein the method further comprises removing edge fragments from the target layout data that have an EPE that is less than an EPE threshold.

20. The computer-readable storage devices of claim 18, wherein the method further comprises determining a sensitivity of the EPEs to one or more process variations.

21. The computer-readable storage devices of claim 20, wherein the method further comprises removing edge fragments from the target layout data that have an EPE that is less than the predetermined EPE threshold and a sensitivity that is less than an EPE sensitivity threshold.

22. The computer-readable storage devices of claim 20, wherein the process variations include variations in dose.

23. The computer-readable storage devices of claim 20, wherein the process variations include variations in focus.

24. The computer-readable storage devices of claim 20, wherein the process variations include variations in polarization.

25. The computer-readable storage devices of claim 20, wherein the process variations include variations in illuminator pattern.

26. The computer-readable storage devices of claim 20, wherein the process variations include variations in MEEF.

27. A method, comprising:
with a computer,
receiving target layout data that defines one or more features to be printed on a wafer,
defining a subset of the features that are not known to print correctly on a wafer, and
storing data for the subset of the features but not storing data for one or more features not in the subset, the stored data being for use by a photolithographic analysis tool.

28. The method of claim 27, wherein the subset is defined by removing cells for at least one of the features from the target layout data.

29. The method of claim 27, wherein the subset is defined by removing polygons from the target layout data.

30. The method of claim 27, wherein the subset is defined by tagging edge fragments in the target layout data.

31. The method of claim 30, wherein the tagged edge fragments are analyzed by the photolithographic analysis tool.

32. The method of claim 30, wherein the tagged edge fragments are not analyzed by the photolithographic analysis tool.

33. The method of claim 27, wherein the subset is revised by removing simulation sites associated with the edge fragments from the target layout data.

34. One or more computer-readable storage devices storing computer-readable instructions that when executed by a computer cause the computer to perform a method, the method comprising:
receiving target layout data that defines one or more features to be printed on a wafer;
defining a subset of the features that are not known to print correctly on a wafer; and
storing data for the subset of the features but not storing data for one or more features not in the subset, the stored data being for use by a photolithographic analysis tool.

35. The computer-readable storage devices of claim 34, wherein the act of defining the subset comprises removing cells for at least one of the features from the target layout data.

36. The computer-readable storage devices of claim 34, wherein the act of defining the subset comprises removing polygons from the target layout data.

37. The computer-readable storage devices of claim 34, wherein the act of defining the subset comprises tagging edge fragments in the target layout data.

38. The computer-readable storage devices of claim 37, wherein the method further comprises analyzing the tagged edge fragments by the photolithographic analysis tool.

39. The computer-readable storage devices of claim 37, wherein the tagged edge fragments are not analyzed by the photolithographic analysis tool.

40. The computer-readable storage devices of claim 34, wherein the subset of is revised by removing simulation sites associated with the edge fragments from the target layout data.

\* \* \* \* \*

UNITED STATES PATENT AND TRADEMARK OFFICE
CERTIFICATE OF CORRECTION

PATENT NO.        : 8,056,022 B2                                   Page 1 of 1
APPLICATION NO.   : 11/937423
DATED             : November 8, 2011
INVENTOR(S)       : Robles et al.

It is certified that error appears in the above-identified patent and that said Letters Patent is hereby corrected as shown below:

Column 6,
Line 14, "returns to 130 until" should read --returns to 140 until--

Column 7,
Line 60, "and is not with a" should read --and is not within a--

Column 8,
Line 56, "and is not with a" should read --and is not within a--

Column 10,
Line 34, "the subset of is" should read --the subset of features is--

Signed and Sealed this
Twenty-eighth Day of August, 2012

David J. Kappos
*Director of the United States Patent and Trademark Office*